United States Patent
Sławomir (10) Patent No.: US 10,158,386 B2
(45) Date of Patent: Dec. 18, 2018

(54) PHASE FILTER AND METHOD FOR INTERFERENCE AND NOISE REDUCTION IN SYSTEMS WITH TWO SIGNAL PATHS

(71) Applicant: Szechniuk Sławomir, Czestochowa (PL)

(72) Inventor: Szechniuk Sławomir, Czestochowa (PL)

(*) Notice: Subject to any disclaimer, the term of this patent is extended or adjusted under 35 U.S.C. 154(b) by 0 days.

(21) Appl. No.: 15/731,711

(22) PCT Filed: Jan. 20, 2016

(86) PCT No.: PCT/PL2016/000005
§ 371 (c)(1),
(2) Date: Jul. 24, 2017

(87) PCT Pub. No.: WO2016/099312
PCT Pub. Date: Jun. 23, 2016

(65) Prior Publication Data
US 2018/0198475 A1    Jul. 12, 2018

(30) Foreign Application Priority Data
Feb. 10, 2015 (PL) .......................................... 411224

(51) Int. Cl.
*H04B 1/10* (2006.01)
*H04B 7/08* (2006.01)
*H04B 7/02* (2018.01)

(52) U.S. Cl.
CPC ............. *H04B 1/10* (2013.01); *H04B 1/1081* (2013.01); *H04B 7/0837* (2013.01);
(Continued)

(58) Field of Classification Search
CPC .......... H04B 7/08–7/0897; H04B 1/10–1/1081
See application file for complete search history.

(56) References Cited

U.S. PATENT DOCUMENTS 3,737,783 A * 6/1973 Oswald .................... G01S 7/42
                                                        455/273
4,006,421 A   2/1977 Mermoz
(Continued)

FOREIGN PATENT DOCUMENTS

DE    4314980 C1    9/1994
EP    0588181 B1    11/2000
(Continued)

OTHER PUBLICATIONS

International Search Report and Written Opinion of the ISA, dated May 20, 2016.
(Continued)

*Primary Examiner* — Duc M Nguyen (57) ABSTRACT

The present invention is a method for interference and noise reduction in systems with two signals paths and a phase filter, primarily applicable in telecommunications receiving systems with two antennas, radiolocation, measuring and medical equipments and other fields where there is a need to reduce undesired signals with different phases or amplitudes. The phase filter have two signals paths, where the input signals x and y are supplied to the voltage adders SX and SY, at the output of which output signals x' and y' are achieved. The differential output signals w2 and w2' are also supplied to these voltage adders.

The differential outputs signals w2 and w2' are obtained by means of one or two power combiners by comparing the voltages received at the output of these power combiners to the average voltages on inputs. Signals supplied to inputs of power combiners are derived from a combination of input signals x and y and difference of voltages between these signals.

For the assembly of two developed filters for a pair of signals of equal amplitude, damping of over 70 dB for angular differences at 25-180°, damping of over 20 dB for
(Continued)

angular differences of +/−15° to +/−25° and damping of more than 40 dB for most signals of different amplitudes can be achieved.

7 Claims, 6 Drawing Sheets

(52) U.S. Cl.
CPC .............. *H04B 1/1036* (2013.01); *H04B 7/02* (2013.01); *H04B 7/0842* (2013.01); *H04B 7/0854* (2013.01)

(56) References Cited

U.S. PATENT DOCUMENTS

| | | | | |
|---|---|---|---|---|
| 4,008,439 | A * | 2/1977 | Schroeder | H04B 1/123 327/100 |
| 4,584,712 | A * | 4/1986 | Isobe | H04B 7/084 455/260 |
| 5,046,133 | A * | 9/1991 | Watanabe | H04B 1/126 455/138 |
| 5,490,094 | A | 2/1996 | Heimburger et al. | |
| 5,524,125 | A * | 6/1996 | Tsujimoto | H04B 7/0845 375/232 |
| 5,838,742 | A * | 11/1998 | Abu-Dayya | H04B 7/0851 375/347 |
| 6,167,243 | A * | 12/2000 | Wang | H04B 7/0842 375/267 |
| 7,221,925 | B2 * | 5/2007 | Wildhagen | H04B 7/0857 375/347 |
| 7,433,384 | B2 * | 10/2008 | Smee | H04B 7/0848 375/142 |
| 9,973,224 | B2 * | 5/2018 | Liu | H04B 1/1027 |
| 2001/0002207 | A1 * | 5/2001 | Miyamoto | H03F 1/3223 375/346 |
| 2013/0102256 | A1 | 4/2013 | Cendrillon | |

FOREIGN PATENT DOCUMENTS

| | | |
|---|---|---|
| JP | S59 210774 A | 11/1984 |
| JP | S60 33752 A | 2/1985 |
| JP | H04 6961 A | 1/1992 |
| JP | H09 83804 A | 3/1997 |

OTHER PUBLICATIONS

Search Report (State of Art) issued by Polish Patent Office for priority dokument P.411224, dated Jul. 7, 2015.

* cited by examiner

PHASE FILTER AND METHOD FOR INTERFERENCE AND NOISE REDUCTION IN SYSTEMS WITH TWO SIGNAL PATHS

The present invention is a method for interference and noise reduction in systems with two signals paths and a phase filter, primarily applicable in telecommunications, radiolocation, measuring and medical equipments and other fields in which there are at least two signal paths, and where there is a need to reduce undesired signals with different phases or amplitudes.

Systems with two signals paths are often used in various fields, mainly in telecommunications, in the so-called diversity techniques. With the possibility to receive signals for example from two antennas, optimization of receiving inputs signals on a wide range of methods is possible, which include, among others, time diversity, frequency diversity and spatial diversification. There is a significant need for the elimination of all kinds of interferences as well as noises in the input circuits of such devices, wherein this interferences most often are characterized by a similar level of voltages in both paths, but they are in a different phase (eg. when a disturbing signal is received from a different direction than required), while the noises of input circuits (limiting the sensitivity) are usually characterized by random amplitudes and phases of different values in the two paths.

Well-known are also many ways to reduce noise and interference in receivers with two intermediate frequency circuits, where the separation of required signals and reduction of unwanted signals are made. Most of these systems only slightly remove undesired signals and mostly a comparison of the signals in the two paths is done by digital processing, eg., through different types of analog-to-digital or DSP systems, but due to technological conditions it is only effective at lower frequencies.

The aim of the developed phase filter and method for interference and noise reduction is to achieve an effective reduction in both the interfering signals and noise. Developed solutions (methods and the phase filter) are characterized by simplicity of operation and high technical parameters, allowing for, using a few basic members of filters connected in series and with uncomplicated structure, significant reduction of the level of unwanted signals (interference signals and noise).

For example, with only two filter members (in circuits with two pairs of power combiners) for a pair of signals of equal amplitude, damping of over 70 dB for angular differences at 25-180°, damping of over 20 dB for angular differences of +/−15° to +/−25° and damping more than 40 dB for most signals of different amplitudes (typical primarily for noise) can be achieved. The main use for this kind of filters can be input circuits of telecommunication devices receiving signals in diversity systems with arrays of two or more antennas, mainly working at high frequencies and microwave. They allow reception of very weak radio signals in conditions of both very strong interference from other stations operating with very high power—both on the adjacent and the reception channels (but sent from a different direction) as well as the reception of signals at very low signal-to-noise ratio (S/NR). For example, using an array with two antennas of even omnidirectional characteristics, thanks to the developed filter—it is possible to obtain a very narrow directional receiving characteristics. The solutions may also be applicable in radiolocations (suppression of the signal coming from lateral directions) as well as in all other areas where there is a need to compare the two signals and eliminate unwanted signals. The developed filter can be equipped with systems of manual or automatic adjustment of parameters, and thus its effect may be optimized according to the needs and parameters of input signals. The filter has a very low internal noise (noise figure), due to the fact that the majority of noise in the filter are compensated for in the comparison system of the voltages at the outputs of the power combiners with the voltages at the input of the filter.

The key feature of the method for interference and noise reduction in systems with two signal paths with one power combiner PC1 is that the input signals x and y are supplied to the voltage adders SX and SY, and the components of their difference, that is components of the voltage Uxy are added to input signals x and y, but with opposite directions and they are supplied as intermediate signals x1 and y1 to input of the power combiner PC1, whose signal p1 at the output of power combiner PC1 is compared with the average value Sr of intermediate signals x1 and y1, and differential signal w1 which is a difference of these values is supplied to the amplifier W1 with a gain kw, whose output being a differential signal w2 is supplied to the adders voltage SX and SY, at the output of which the output signals x' and y' are achieved. Preferably, the input signals x1 and y1 have vector values $x1=k[(x+y)+a*Uxy]$ and $y1=[(x+y)-a*Uxy]$ and the differential output signal $w_2$ has value $w2=kw*[p1/kp-(x1+y1)/2]$, while the factors kp, a, k, kw can take any real values, preferably $k=0.5-2$; $a=1-4$; $kp=\sqrt{2}$; $kw=1-5$.

The key feature of the method for interference and noise reduction in systems with two signal paths with two power combiners is that the input signals x and y are supplied to the voltage adders SX and SY, and the components of the difference of these signals are added to the input signals x and y, that is components of the voltage Uxy, but with opposite directions and the pairs of intermediate signals x1 and y1 and x1' and y1', are achieved which are supplied respectively to the inputs of power combiners PC1 and PC2, whose output voltages, respectively the signals p1 and p1' at the outputs of the power combiners PC1 and PC2 are compared with average values as pairs of signals x1 and y1 and x1' and y1', respectively as the values of Sr and Sr', and the differences of these signals in the form of differential signals, respectively w1 and w1', are supplied to the differential amplifiers with a gain kw and kw', respectively, W1 and W2, whose output signals, respectively w2 and w2' are supplied to the voltage adders, respectively SX and SY, at the output of which output signals x' and y' are achieved. Preferably, the intermediate signals x1, y1, x1', y1' have vector values $x1=k[(x+y)+a*Uxy]$ and $y1=k[(x+y)-b*Uxy]$ and $x1'=k[(x+y)-a*Uxy]$ and $y1'=k[(x+y)-b*Uxy]$ and the differential signals have vector values: $w1=p2/kp-(x1+y1)/2$ and $w1'=p2'/kp-(x1'+y1')/2$, and output differential signals have vector values: $w2=kw*w1$; $w2'=kw*w1'$, while the factors a, b, k, kw, kp can take any real values, preferably: $k=0.5-2$; $a=0.5-8$; $b=0.5-8$; $kp=\sqrt{2}$; $kw=1-5$. Preferably, one of the inputs signals x or y is supplied to the input of the system via the phase shifter PF. Preferably, the level of the differential output signals w2, w2' and/or phase shift of the phase shifter PF is adjusted manually or automatically from the control system cooperating with the device at the output of the filter.

The key feature of the phase filter for two independent signal paths is that the inputs of signals x and y are connected to the outputs of signals x' and y' by adders voltage, respectively SX and SY, and the inputs of signals x and y are also connected with the control system US, whose two pairs of outputs are connected to the inputs of power combiners PC1 and PC2, whose outputs are connected to the inputs of differential adders, respectively S1 and S2, whose other inputs are connected to the adding-matching systems, respectively SA and SB whose inputs are connected to respective pairs of inputs of power combiners PC1 and PC2, and the output of differential adders, respectively S1 and S2 are connected to the inputs of differential amplifiers, respectively W1 and W2, whose outputs are connected to corresponding inputs of the voltage adders SX and SY.

The developed method for interference and noise reduction in systems with two signal paths and developed phase filter are further described in the embodiments, and are reproduced in the drawings, which show.

Figure 1:
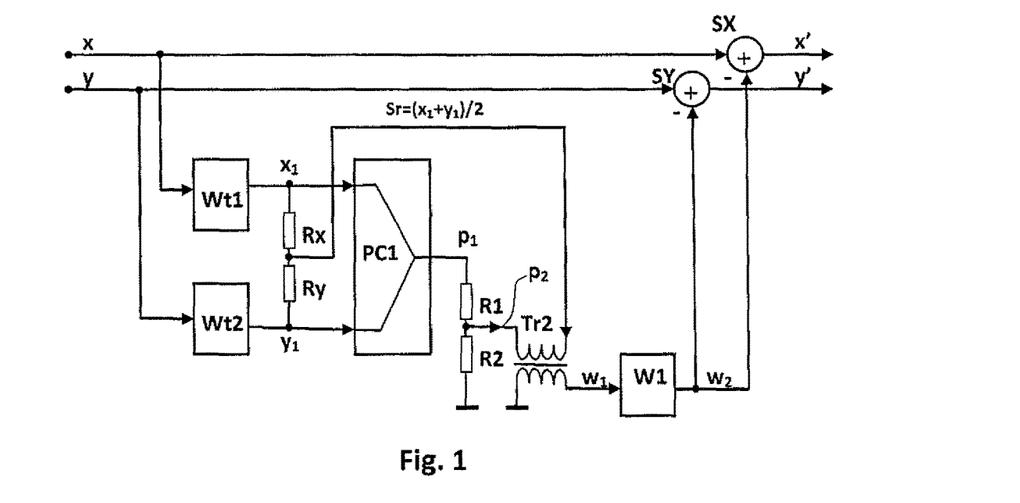
FIG. 1—method for interference and noise reduction with filter with one power combiner, FIGS. 2a, 2b, 2c, 2d—voltage vectors of filter with one power combiner, FIG. 3—graph of differential voltage of filter with one power combiner, FIG. 4—damping characteristics of filter with one power combiner, FIG. 5—method for interference and noise reduction with the modified filter with one power combiner, FIG. 6—voltage vectors of the modified filter with one power combiner, FIG. 7—the damping characteristics of the modified filter with one power combiner, FIG. 8—a method of interference and noise reduction with filter with two power combiners, FIG. 9—voltage vectors of filter with two power combiners, FIG. 10—damping characteristics of the filter with two power combiners, FIG. 11—a method for interference and noise reduction with two filters, phase shifter and regulation of filter parameters, FIGS. 12a, 12b—damping characteristics of a system with two filters, FIG. 13—block diagram of the phase filter.

A method of interferences and noise reduction in circuits with two signal paths has been shown in FIG. 1 in the block diagram as an example of the filter with one power combiner PC1. The input signals x and y of two signal paths are supplied on voltage adders, respectively SX and SY and on the output of which the output signals x' and y' are received. The input signals x and y as intermediate signals x1 and y1 are also supplied by the voltage followers, respectively Wt1 and Wt2 to the inputs of the power combiner PC1. Output signal p1 from the power combiner PC1 is supplied to the voltage divider made by resistors R1 and R2 giving at the output the reference signal p2, reduced in relation to the value of the signal p1 by value $\sqrt{2}$ (p2=p1/$\sqrt{2}$)). The reference signal p2 is supplied to the transformer Tr2, where on the second primary winding the average signal Sr is supplied, formed as an average value of intermediate signals x1 and y1 at the input of the power combiner PC1 through resistors Rx and Ry of equal resistance. Thus, at the input of transformer Tr2 differential signal w1 is created as a difference between the average voltage Sr and reference voltage p2. The differential signal w1 from the secondary winding of the transformer Tr2 is supplied to the amplifier W1, which after amplification by a factor kw as the output difference signal w2 is supplied to the inputs of voltage adders SX and SY.

Figure 2A:
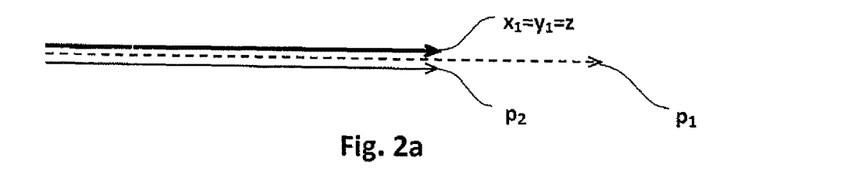
Figure 2B:
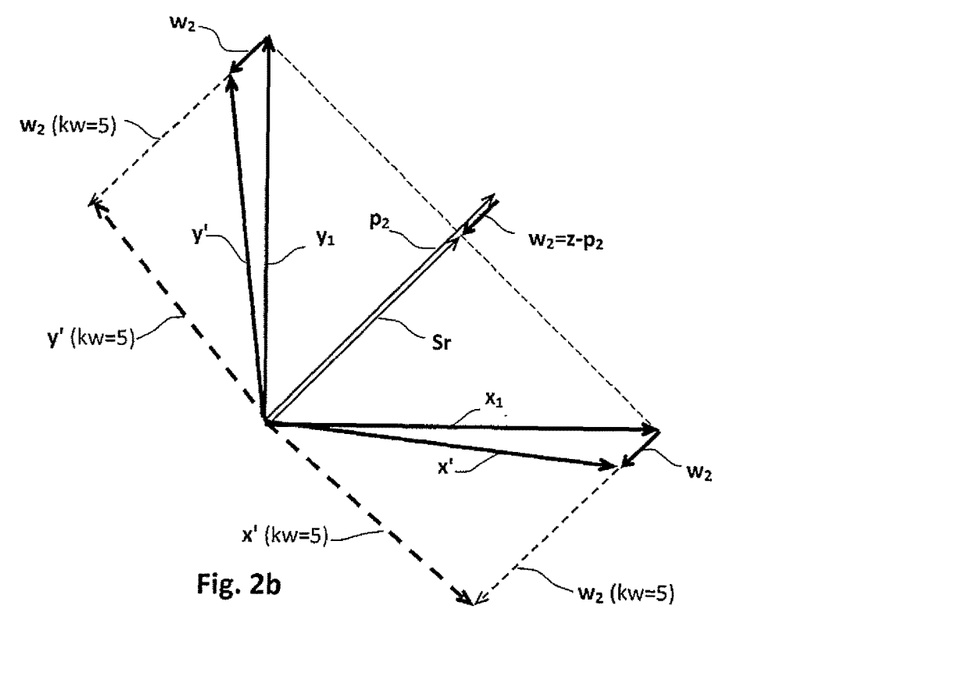
Figure 2C:
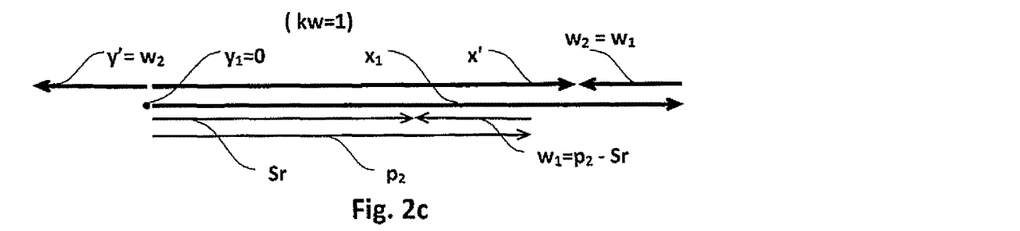

FIG. 2a, 2b, 2c show voltage vectors of filter with one power combiner for different input signals x and y.

FIG. 2a shows the voltage vectors of input signals x and y at the same frequency, amplitude and phase. Assuming that x=x' and y=y' (gain factors of the voltage followers Wt1 and Wt2 are equal to 1), the turns ratio of the output transformer Tr2 and the gain of the amplifier W1 are also equal to 1, and the input and output resistances of the power adder PC1 are the same, then for such parameters of input signals x and y the output differential signals w2 will have a value of zero, resulting from the fact that the reference voltage p2 will equal to the average value of the input signal x and y, which is Sr:

$$p2=\sqrt{(x1*x1+y1*y1)}/\sqrt{2}=Sr=(x1+y2)/2, \text{that is}$$
$$w1=w2=p2-Sr=0$$

For such parameters, the output signals x' and y' in the outputs of voltage adders SX and SY will be identical to the input signals x and y.

FIG. 2b shows graphs of vectors for input signals x and y with equal amplitude and the phase difference α=90°. For such a phase deviation, the mean amplitude of intermediate signals x1 and y1, which is Sr will be of $\sqrt{2}/2=0.71$ of their value, the amplitude of the reference signal p1 at the output of power combiner PC1 will amount to $$\sqrt{\sqrt{2}} = 1.20$$

amplitude of the intermediate signals x1 or y1, and the amplitude of the reference voltage p2 will be $$\sqrt{\sqrt{2}}/\sqrt{2} = 0.84$$

of amplitude of the intermediate signals x1 or y1. Thus, differential signals w2 with amplitude values w2=0.84–0.70=0.14 of the input signals x and y supplied to voltage adders SX and SY will cause angular deflection of output signals x' and y' and the reduction of their amplitudes with respect to the input signals x and y.

Figure 2D:
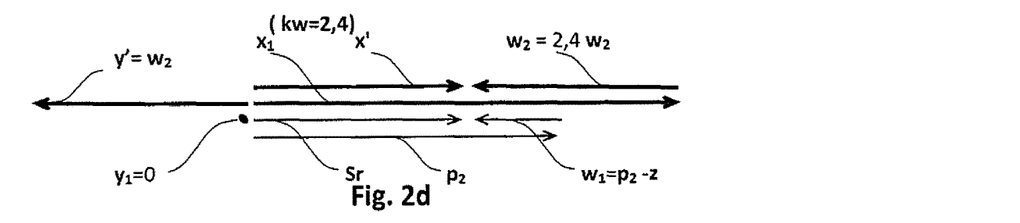

FIG. 2c shows graphs of vectors when one of the input signals, in this case the input signal y is zero. For such values of the amplitudes of the input signals x and y, the value of average signal Sr of input signals x and y will be 0.5 amplitude of the input signal x, the amplitude of the signal p1 at the output of the power combiner PC1 will be equal to the amplitude of the input signal x and the amplitude of the reference signal p2 will be $1/\sqrt{2}$ of amplitude of the signal x. Thus, the differential signals w2 with amplitude values of $(0.5-1/\sqrt{2})$ supplied to the voltage adders SX and SY cause a decrease in the amplitude of the input signal x and an increase in the amplitude of the signal y from zero to a value of $(0.5-1/\sqrt{2})$. If the difference signal w1 was amplified by a factor kw=2.4 (for example, by means of turns ratio of transformer Tr2 or by amplifier W1, the output signals x' and y' will have equal amplitudes and they will be deviated from each other by 180° and the sum of the voltage vectors will be zero as shown FIG. 2d. Therefore, if the voltage adder of output signals x' and y' is used on the output of the filter, then such a system will entirely suppress all of the input signals that will appear in only one of the inputs of the filter.

Figure 3:
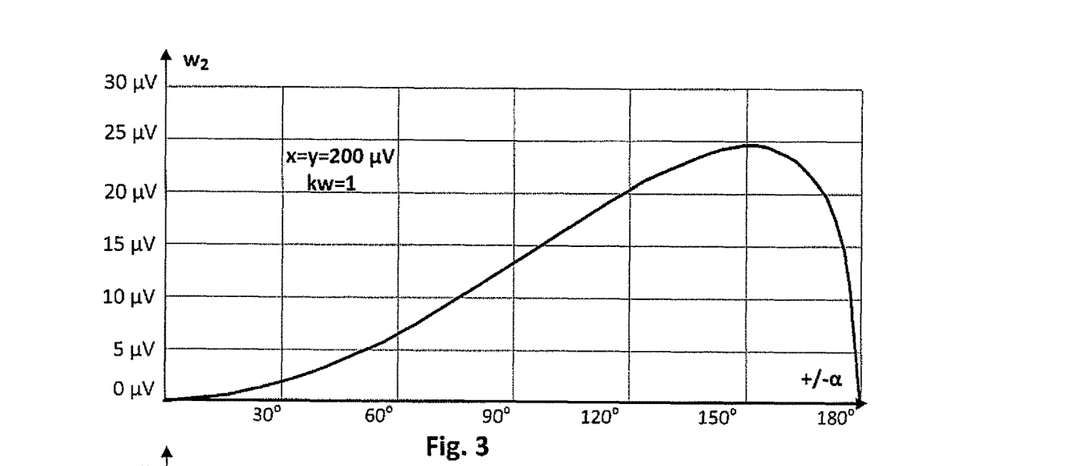

FIG. 3 shows the actual values of the differential signal w2 depending on the angle α between the input signals x and y and value of their amplitudes x=y=200 microvolts. For such values the amplitude of differential signal w2 reaches a maximum at an angle of α=ca.150° and then has a value close to the average value of vectors of input signals x and y. Thus, for such value of the angle α a sum of vectors of the output signals x' and y' is equal to zero (the signals have equal values but opposite directions).

Figure 4:
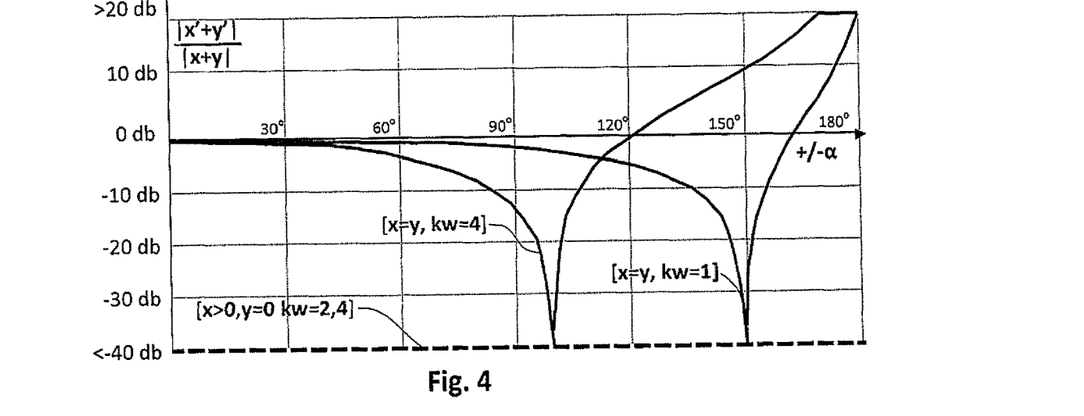

FIG. 4 shows the damping characteristics of such a filter for the gain of the amplifier W1 kw=1 and kw=5. The dashed line shows damping of filter when one of the input signals is set to zero (y=0) and kw=2.4.

Figure 5:
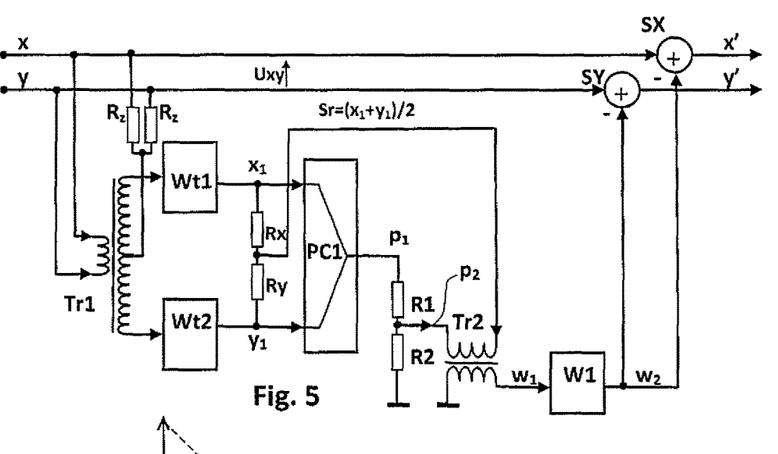

FIG. 5 shows a method of interference and noise reduction with a modified filter system in which the phases of the intermediate signals x1 and y1 on the input PC1 are not equal to phases of the input signals x and y—are more deviated. This is achieved in such a way that the differential of input signals x and y, which is Uxy signal, applied to the primary winding of the voltage step-up transformer Tr1 with turns ratio a is added (but in opposite directions) to the mean value of input signals x and y, which are received by two resistors of equal resistance Rz. Thus, on the inputs of the power combiner PC1 are supplied intermediate signals x1 and y1, which are the sum of the vector of average value of the input signals x and y and the voltage vector proportional to the difference of these signals but having opposite senses. In this way, the intermediate signals x1 and y1 deviated from each other and supplied to the power combiner PC1 produce higher, more pivoted (than in the previous example) reference voltage p2, and therefore increased attenuation is obtained at the smaller phase angle α.

Figure 6:
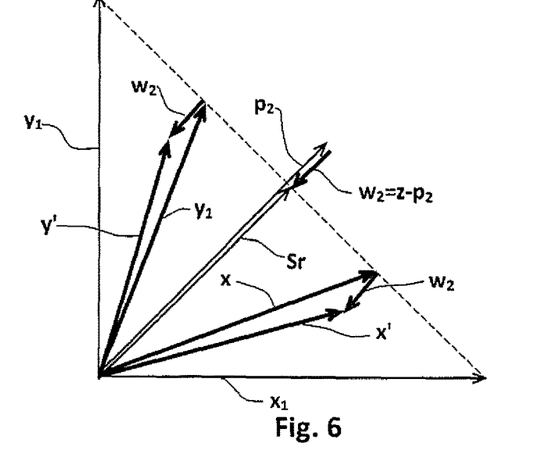

FIG. 6 shows graphs of vectors of the filter presented in FIG. 5 for an exemplary phase angle α=45° and the turns ratio a=1 of the transformer Tr1. As shown in FIG. 6, for the phase angle α=45° obtained reference voltage value p2 is the same as the one obtained in the previous example (shown previously in FIG. 2*b*) at an angle of 90°. By this method, in practice an increased attenuation already for small values of phase angles α is achieved.

Figure 7:
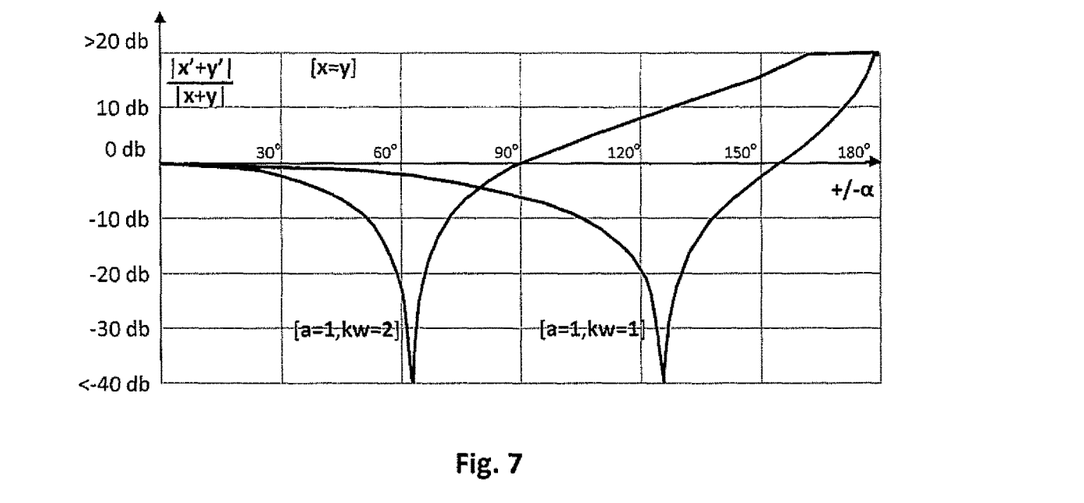

FIG. 7 shows the damping characteristics of the modified filter with the turns ratio a=2 and two gain factors of differential signals w1 in amplifier W1: kw=1 and kw=2.

Figure 8:
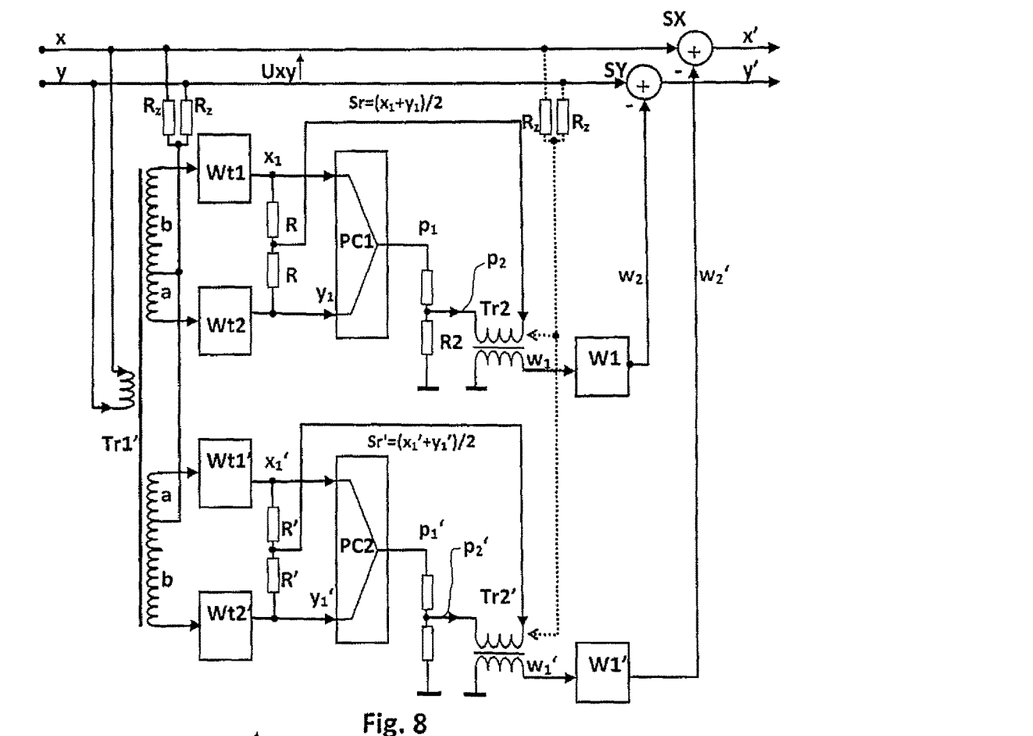

FIG. 8 shows an example of the method for noise and interference reduction by a system with two power combiners PC1 and PC2. In this arrangement, appropriate intermediate signals, respectively; x1 and y1 and x1' and y1' are supplied to the inputs of power combiners PC1 and PC2, where these signals are formed as the sum of the mean value of input signals x and y and components of the difference of these signals (i.e., as voltage Uxy between the signals x and y) obtained by the transformer Tr1, where the components are not equal—the secondary windings have a different number of turns (with turns ratios a and b) and the average value of input signals is obtained by means of the resistor dividers Rz with the same resistance.

Signals supplied to the power combiners PC1 and PC2 can be described by equations (in the vectors):

$$x1=k[(x+y)/2+a*Uxy]; y1=k[(x+y)/2-b*Uxy]; x1'=k[(x+y)/2-a*Uxy]; y1'=k[(x+y)2+b*Uxy]$$

wherein the factors k, a, b can take any real value, preferably k=1, a=0.5–8, b=0.5–8. The reference signals p2 and p2' obtained at the outputs of the power combiners PC1 and PC2 are compared to the average voltage signals Sr and Sr', respective pairs of intermediate signals x1 and y1 and x1' and y1' by the output transformers Tr2 and Tr2', and the differential signals w1 and w1' are supplied by amplifiers W1 and W2 with a gain of kw and kw' as the output differential signals w2 and w2' to voltage adders SX and SY.

Alternatively, a dotted line shows the option, where the reference signals p2, p2' are compared with the average signals Sr, Sr', but the average value of the signals x and y obtained by the resistors of the same resistance Rz is given to the output transformers TR2, TR2'.

Figure 9:
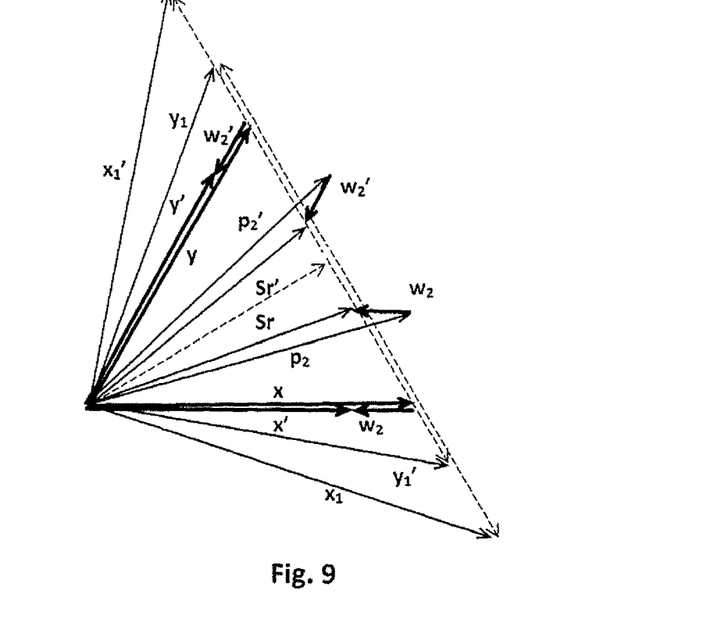

FIG. 9 illustrates phase graphs of developed method with two power combiners presented in FIG. 8 with a phase angle of 90° and the value of factors k=1 and a=0.6, b=0.85, kw=1. As can be seen from the graph, due to the phase shift of pairs of intermediate signals x1 and y1 and x1' and y1' in reference to the input signals x and y obtained by using the secondary windings of the transformer Tr1' of different transmissions, the vectors of reference signals p2 and p2' are deviated from the medium voltage vectors Sr and Sr'. For the above values of factors a and b, in contrast to the previous method, due to the comparison of the reference voltages p2 and p2' of the respective signal vectors medium Sr and Sr', at the outputs of transformer Tr2 and Tr2' differential signals w1 and w1' of the phase opposite to the appropriate input signals x and y are received. Thus, after amplification of these signals on amplifiers W1 and W2 and passing them on voltage adders SX and SY, they significantly reduce the value of the amplitude of the output signals x' and y' for both x and y input signals with different phases and amplitudes.

Figure 10:
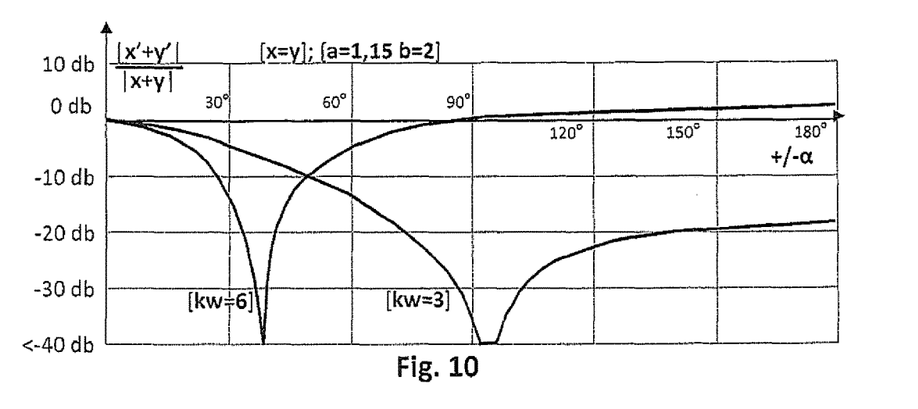

FIG. 10 shows the damping characteristics of method with two power combiners presented in FIG. 8 for different values of the factors [a=1.14; b=2; kw=3], and [a=1.14; b=2; kw=6].

Figure 11:
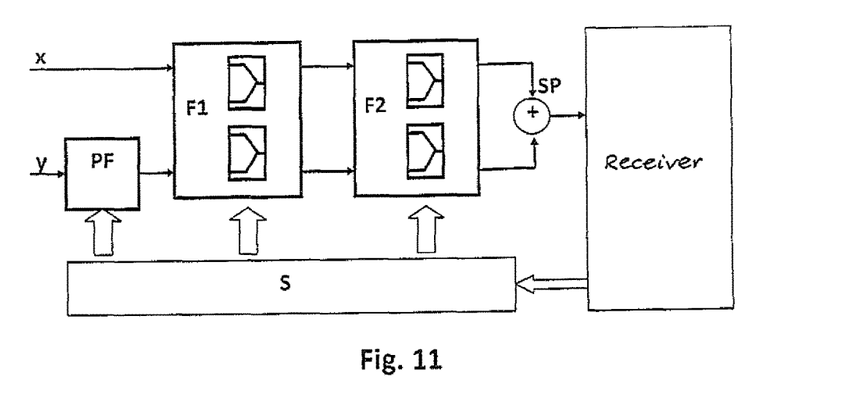

FIG. 11 shows the method of interference and noise reduction in system with two filters, phase shifter PF and adjustment of filter parameters. In this solution, one of the inputs signal, in this case the input signal y is supplied to the input of the first filter F1 with two power combiners via a manually or automatically adjustable phase shifter PF. The output signals x' and y' of the filter F1 are supplied to the second filter F2 with two power combiners, whose outputs are connected to the other, downstream stages of the apparatus by means of the power combiner SP. Depending on the type of devices with which phase filter or set of filters can function, various relevant parameters of these filters can be manually or automatically adjusted depending on the settings.

These parameters include mainly the gain factors of difference signals kw, kw', gain factors of amplifiers W1 and W2, adjustment of which enables an optimal damping characteristic at a time. Value of parameters of medium signals Sr', Sr and reference signals p2, p2' may also be regulated, whereby a filter with zero dumping for the same type of input signals x and y may additionally increase or suppress these signals. Adjusting of the phase shifter PF allows to select the desired angle of phase difference between input signals. With automatic adjustment of these parameters the control signals are supplied from further parts of the device with the filter cooperates—for example in telecommunications receiver it may be signals from detector or AGC system.

Figure 12A:
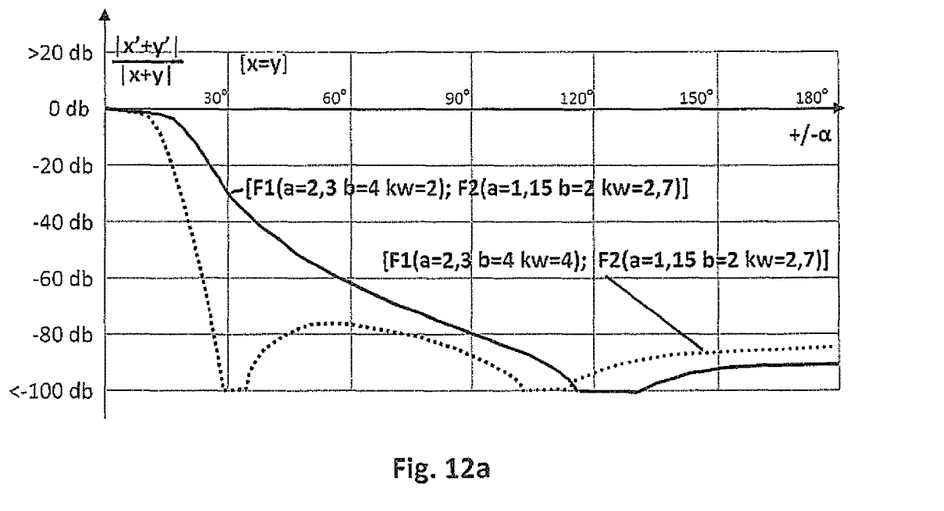
Figure 12B:
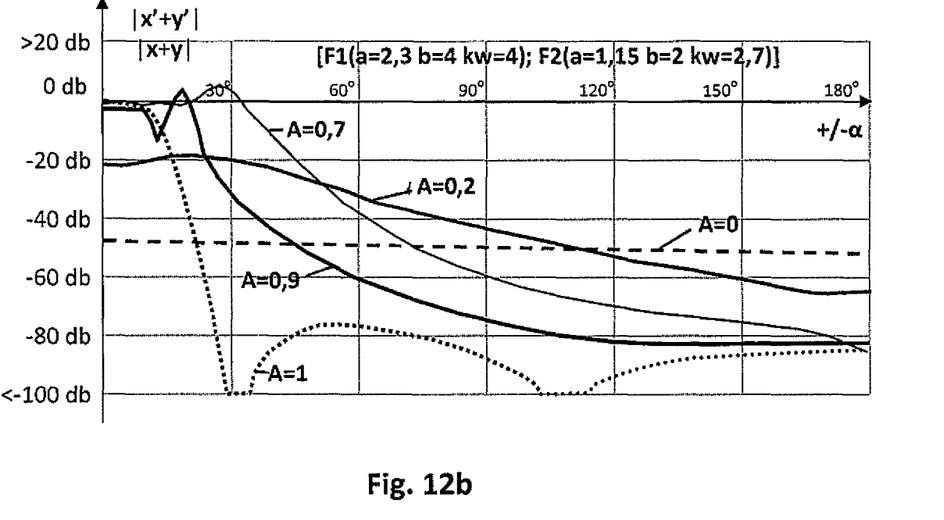

FIGS. 12*a* and 12*b* shows the characteristics of an assembly of two filters F1 and F2 having two power combiners each for various values of the parameters a, b and kw and an A, which represent ratio of amplitudes of input signals x and y. As you can see from the characteristics, for an assembly of two filters F1 and F2 and input signals x and y with equal amplitudes, the damping of over 70 dB for angular differences 25-180°, the damping of over 20 dB for angular differences of +/−15° up to +/25° and damping of more than 40 dB for most of the input signals with different amplitudes is achieved.

Methods presented on FIG. 1, FIG. 4 and FIG. 8 are given only as examples suitable for the present of developed methods and the filter. They represent the most commonly used option of method—as phase band-pass filter, which for compatible input phase values of input signals x and y have gain=1 and dumps the other, differential input signals x and y. With the reversed-phase differential of output signals w2 and w2', one can get a band-stop filter, which amplifies only the signals of different phases and amplitudes. Similarly, for input signals x and y of the same phase it is not necessary to maintain the condition of conformity of average signal Sr, Sr' with the reference voltages p2, p2'. In the presented examples amplifying of the filter for the input signals x and y with the same phase the is equal to unity, which seems to be the most common case of its use. With non-compliance, the damping characteristics (with greater or lesser change in shape) moves up or down, for example for input signals with the same phase at the output of the filter signals x' and y' damped or gained by 6 db can appear.

The existence of resistors R1 and R2 matching (herelowering) output signals p1, p1' from power combiners PC1 or PC2 to reference voltages p2, p2' is not obligatory. The same effect can be obtained for example by virtue of the powers combiners PC1 and PC2 constructed in a transformer circuits, whose output impedance does not have to be equal to the resistance of the inputs (can be smaller), and therefore the voltage signals p1, p1' in the outputs of power combiners PC1 and PC2 is automatically lowered to the required level. Also, the use of output transformers Tr2, Tr2' as part of comparing the average signals Sr, Sr' with the reference signals p2, p2' is not necessary. There can be used any electronics devices comparing these voltages and giving the output differential signals w1, w1'.

Also, instead of the input transformer Tr1 other arbitrary electronic circuits for transforming the input signals x and y to the intermediate signals x1, y1, x1', y1' can be applied— that is, signals consisting of the sum of the components of the medium and the difference of the input signals x and y, but with the appropriate reimbursement of these phases. With regard to the voltage adders SX and SY other devices of voltages or power adders can be used. Also in relation to voltage followers Wt1 or Wt2, they may be replaced by other amplifying or separating devices. Amplifiers of difference signals W1, W2 can be replaced by voltage followers or they do not have to be there at all—for example the differential signal can be supplied to voltage adders SX and SY directly from the output transformer Tr2, Tr2' with the appropriate turns ratio.

Figure 13:
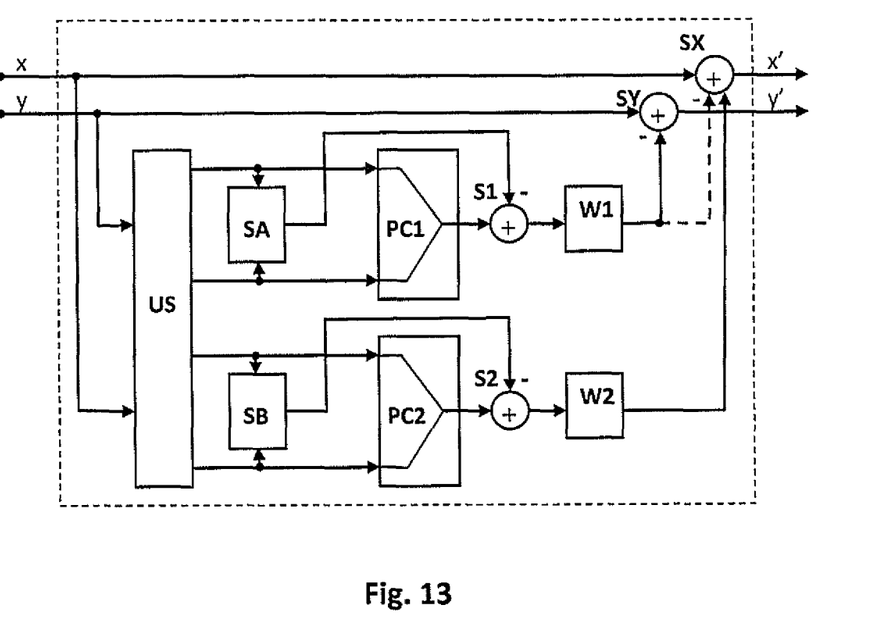

Due to the above mentioned conditions, generalized block diagram of the phase filter has been developed separately as shown in FIG. 13.

Presented in FIG. 13 the phase filter has two signal inputs x and y and two signal outputs x' and y'. Signal inputs x and y are connected to the output signal x' and y' by power combiners or voltage adders, respectively SX and SY. Signal inputs x and y are connected to the control system US, whose two pairs of outputs are connected to the inputs of power combiners PC1 and PC2. Outputs of power combiners PC1 and PC2 are connected to the inputs of adders, respectively S1 and S2, whose other inputs are connected to the adding-matching systems, respectively SA and SB, whose inputs are connected to the respective pairs of input of power combiners PC1 and PC2. Outputs of adders SA and SB are connected to the inputs of amplifiers W1 and W2 respectively, whose outputs are connected to corresponding inputs of the power combiners or voltage adders SX and SY.

LIST OF SIGNS x—input signal;
y—input signal;
Uxy—voltage between signals x and y;
x'—output signal;
y'—output signal;
WT1, Wt2—voltage followers of the input signals;
Wt2', Wt2'—voltage followers of the input signals;
x1, y1—intermediate signals (inputs of power combiner PC1);
x1', y1'—intermediate signals (inputs of power combiner PC2);
Sr, Sr'—average value (of signals in inputs of PC1 and PC2);
PC1, PC2—power combiners;
p1, p1'—signals in the outputs of power combiners PC1 and PC2;
p2, p2'—reference signals of power combiners PC1 and PC2;
Rz, Rz—resistor divider;
Tr2, Tr2'—output transformers;
w1, w1'—differential signals;
W1, W2—differential amplifiers of signals w1, w1';
kw, kw'—gains (ampification factors) of amplifiers W1, W2;
w2, w2'—differential output signals at the outputs of W1, W2;
SX—voltage adder;
SY—voltage adder;
Tr1—input transformer;
a, b—turns ratios of input transformer;
F1, F2—filters;
US—control system of filter with two combiners;
SA, SB—adding-matching systems;
S—control system of the phase shifter PF and/or factors kw;
SP—power combiner;
S1, S2—differential adders;
PF—phase shifter;
α—phase angle between input signals x and y;
A—input signal amplitude ratio $A=|x|/|y|$.

The invention claimed is:

1. A method for interference and noise reduction in a system with two signal paths, comprising:
receiving input signals x and y for supplying to voltage adders SX and SY;
obtaining components of a voltage Uxy comprising opposite directions from a difference value of the input signals x and y;
adding the components of opposite directions to a value proportional to a sum of values of the input signals x and y to obtain intermediate signals x1 and y1;
combining the intermediate signals x1 and y1 with a power combiner PC1 to output a signal value p1;
comparing the signal value p1 with an average value Sr of the intermediate signals x1 and y1;
obtaining a differential signal w1, which is a difference of the values p1 and Sr, and supplying the differential signal w1 to an amplifier W1;
amplifying the amplifier W1 with a gain kw to output a differential signal w2 and supplying the differential signal w2 to the voltage adders SX and SY; and
obtaining output signals x' and y' from the voltage adders SX and SY based on the input signals x and y and the differential signal w2.

2. The method for interference and noise reduction according to claim 1, wherein the intermediate signals x1 and y1 have vector values $x1=k[(x+y)+a*Uxy]$ and $y1=k[(x+y)-a*Uxy]$ and the differential output signal w2 has value $w2=kw[p1/kp-(x1+y1)/2]$, where the factors kp, a, k, kw are real values, preferably k=0.5 to 2; a=1 to 4; kp=sqrt of 2; kw=1 to 5.

3. A method for interference and noise reduction in a system with two signal paths, comprising:
  receiving input signals x and y for supplying to voltage adders SX and SY;
  obtaining components of a voltage Uxy comprising opposite directions from a difference value of the input signals x and y;
  adding the components of opposite directions to a value proportional to a sum of values of the input signals x and y to obtain pairs of intermediate signals, respectively x1 and y1, and x1' and y1';
  combining the pairs of intermediate signals with power combiners PC1 and PC2 to output signal values p1 and p1';
  comparing the signal values p1 and p1' with average values Sr and Sr' of the pairs of intermediate signals;
  obtaining differential signals w1 and W1', which are differences of the values, respectively p1 and Sr, and p1' and Sr', and supplying the differential signals w1 and w1' to amplifiers W1 and W2;
  amplifying the amplifiers W1 and W2 with a gain kw and a gain kw' to output amplified differential signals w2 and w2' and supplying the amplified differential signals w2 and w2' to the voltage adders SX and SY; and
  obtaining output signals x' and y from the voltage adders SX and SY based on the input signals x and y and the amplified differential signals w2 and w2'.

4. The method for interference and noise reduction according to claim 3, wherein the intermediate signals x1, y1, x1' and y1' have vector values $x1=k[(x+y)+a*Uxy]$, $y1=k[(x+y)-b*Uxy]$, $x1'=k[(x+y)-a*Uxy]$ and $y1'=k[(x+y)+b*Uxy]$, and the differential signals have vector values $w1=[p1/kp-(x1+y1)/2]$, $w1'=[p1'/kp-(x1+y1)/2]$, and the amplified differential signals w2 and w2' have vector values $w2=kw*w1$, $w2'=kw'*w1'$, where the factors a, b, k, kw, kp are real values, preferably k=0.5 to 2; a=0.5 to 8, b=0.5 to 8; kp=sqrt of 2; kw=1 to 5.

5. The method for interference and noise reduction according to claim 3, wherein one of the input signals x or y is supplied to an input of the system via a phase shifter.

6. The method for interference and noise reduction according to claim 5, wherein a level of the amplified differential signals w2, w2' and/or a phase shift of the phase shifter is adjusted manually or automatically from a control system cooperating with a device at an output of a filter.

7. A phase filter for two independent signal paths, comprising:
  a control system for receiving input signals x and y and outputting pairs of intermediate signals based on a difference value and a sum value of the input signals x and y;
  an adding-matching system for receiving the pairs of intermediate signals and outputting average values of the pairs of intermediate signals;
  power combiners PC1 and PC2 for receiving and combining the pairs of intermediate signals to output combined signals;
  differential adders S1 and S2 for outputting differential signals based on the average values and the combined signals;
  amplifiers W1 and W2 for amplifying the differential signals; and
  voltage adders SX and SY for outputting output signal x' and y' based on the input signals x and y and the amplified differential signals.

* * * * *